Figure 1:
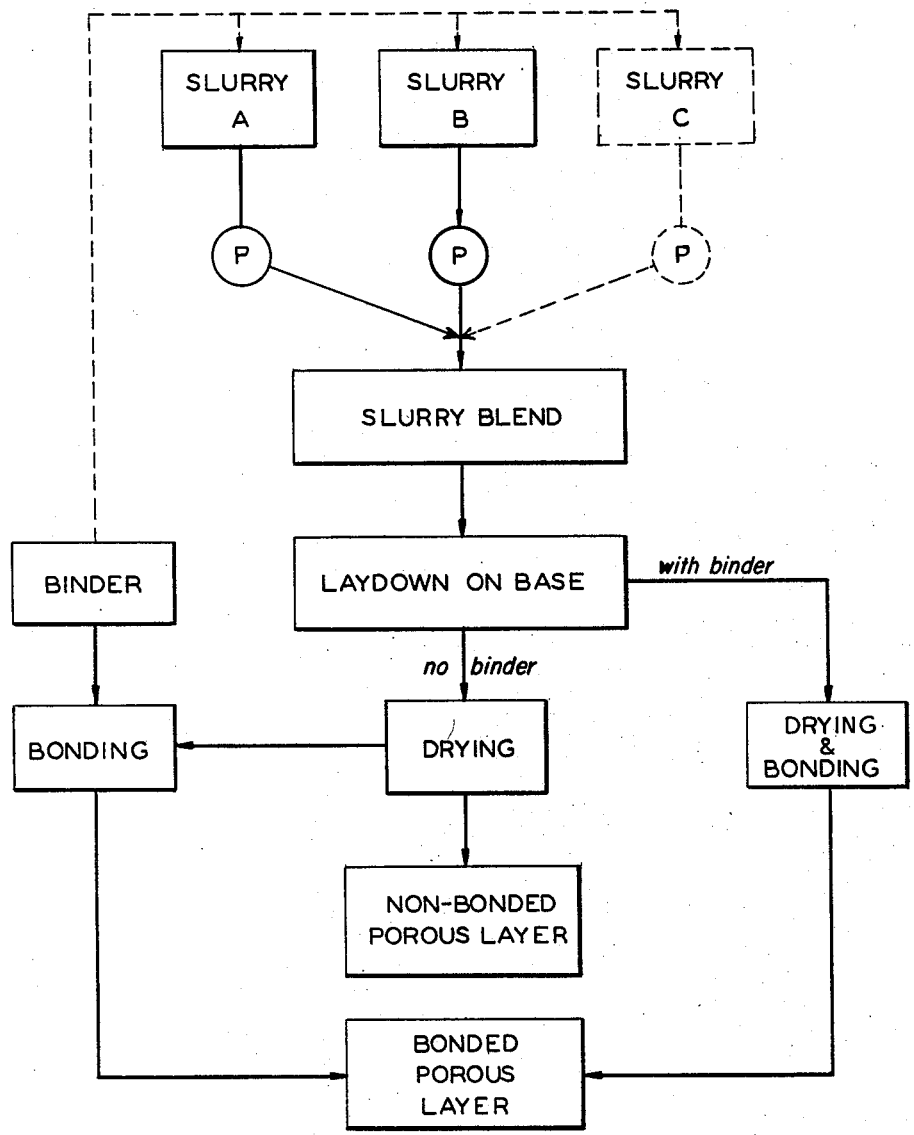

Nov. 24, 1964  D. B. PALL ETAL  3,158,532
TAPERED PORE FILTER ELEMENTS

Filed Dec. 6, 1960  4 Sheets-Sheet 4

United States Patent Office 3,158,532
Patented Nov. 24, 1964

3,158,532
TAPERED PORE FILTER ELEMENTS
David B. Pall, Roslyn Heights, and Cyril A. Keedwell, Levittown, N.Y., assignors to Pall Corporation, Glen Cove, N.Y., a corporation of New York
Filed Dec. 6, 1960, Ser. No. 74,130
18 Claims. (Cl. 162—103)

This invention relates to porous materials, and particularly nonwoven fibrous materials, especially adapted for use as filter media, and to a process for preparing such materials. The materials comprise mixed particles of different sizes, and are characterized by tapered pores defined by varying the proportion of particles of different sizes from surface to surface of the material.

Filter media can generally be classified as being of one of two types—depth filters and surface filters. A surface filter removes suspended material from the fluid passed through the filter by collecting such material on its surface, and the material thus removed forms a filter cake or bed upon the filter. This material naturally obstructs the openings in the surface of the filter, because the fluid must flow through this material, which thus effectively reduces the diameter of the filter openings to the size of the pores in the filter cake. This reduction in effective diameter of pore openings in the filter increases the pressure differential required to maintain flow through the filter. As this process continues, the filter eventually becomes clogged, and must be cleaned or replaced. This is a necessary task which occurs with burdensome frequency when large amounts of suspended material must be removed.

In order to overcome this problem, and obtain a longer life for the filter before cleaning or replacement becomes necessary, inert materials have been added to the fluid which serve to maintain a greater proportion of open area in the filter cake. Such materials are called filter aids, and diatomaceous earth is a typical example. Coarser filters capable of removing the coarsest of the suspended material have also been inserted earlier in the fluid line, to remove some of the suspended material before the main fine pore filter is reached. Neither of these expedients is always practical, and consequently surface filters because of their low dirt capacity are not always practical to meet large scale commercial filtration needs.

In depth filtration, the filter element is designed to remove contaminants not only on the surface of the element but also as the fluid passes through the element, which has a considerable thickness and which has a plurality of pores of distinct length. The length of the pores increases the dirt capacity, because there is more room for dirt along the pores. Most depth filters are made of masses of fibers or other particulate material, held together by mechanical means or by bonding. One or several layers of such materials can be employed, and these layers can vary in porosity, with the coarsest layer usually arranged to first contact the suspended material, thereby removing from the fluid medium first the coarser and then the finer material as it passes through the filter, thus obtaining some distribution of the contaminants through the filter, and obtaining an extended life as compared to a surface filter.

In a depth type filter having uniform diameter pores from surface to surface, the greatest percentage of contaminants is trapped near the upper surface, since any particle small enough to penetrate the first portion of the filter can also penetrate the remainder. To avoid this, several layers of varying coarse to fine pores have been combined in series. A depth filter element of this type, quite apart from the difficulty of preventing separation of the layers, still presents somewhat of a problem of dirt distribution, since each layer acts like a surface filter at the junction at the effluent side of the coarser layer and the influent side of the finer layer. The greatest percentage of contaminants unable to pass through a given layer still is trapped at the influent surface of that layer.

It is also possible to reduce the porosity of a filter of the depth type by greatly increasing the density or compression of the filter from the influent towards the effluent side. However, the uniformity of size of the average fibers or particles of which the medium is formed limits the range of densities obtainable, if a reasonable porosity is to be maintained. Furthermore, the manufacture of multi-density and multi-layered depth type elements is time-consuming, expensive, and only practical in relatively thick media.

In accordance with this invention, a process is provided for manufacturing porous materials in the form of bats or sheets of any desired thickness having pores which are tapered and capable of continuous variation in diameter and configuration from one surface of the medium to the other. In this way, the surface dirt retention effect characteristic of surface filters and multi-layered depth filters is avoided in the porous materials of the invention, and the entire open volume of the porous material is available to its maximum extent, for a higher dirt capacity, before clogging.

In the process of the invention, particulate material, which can be in the form, for example, of fibers or granules of the material of which the porous material is to be composed, is suspended in a fluid and deposited therefrom in the form of a porous layer on and/or into a base. Particulate material of at least two sizes, each size suspended in fluid systems, separately, are blended together in the desired proportions before laydown on the base, and the desired configuration in pore diameter from surface to surface of the material is obtained by varying the proportion of the multi-size materials in the layer during deposition. The different size particles can be deposited in any proportions and in any order at any point in the layer, so that a porous material can be obtained in which the pores are of any configuration and have a constantly varying diameter. The pore diameter at the surfaces can be large or small, and can increase or decrease in any portion or throughout, as desired.

The configuration of the pores depends not only on the choice and concentration of the materials deposited but also on the base or substratum on which the particulate materials are deposited. In general, one or more of three types of bases will be used:

(1) A base from which the porous layer is removed prior to use.

(2) A base which remains a part of the porous layer during its useful application but which is a distinct and separate layer removeable from the layer due to the non-penetration of fibers into the base.

(3) A base which remains a part of the porous layer during its useful application and whose filtration characteristics are modified by the penetration and impregnation thereof by particulate material to form an impregnated ultra-fine filter medium.

Exemplary of such bases are a reinforcing screen or supplemental filter, say, of greater strength, or having a greater or lesser porosity, such as a filter paper or plastic membrane, the porous layer furnishing depth-type filtration in conjunction with said supplemental element.

The process of the invention is applicable to particulate material or any type or size, the only requirement being that the material be capable of being suspended in a fluid, so that the fluid systems can be blended and the blend brought to the base upon which the particulate material is to be deposited. Fibrous material is particularly desirable, because of its versatility. A great variety of diameters of fibers are available, thus making it possible to achieve a very large assortment of mixtures of different diameter fibers for making fibrous material of any porosity, and such fibers can be made of any length, so as to take advantage of the greater cohesiveness of a layer of long fibers, as compared to granular material layers. Typical fibrous materials include glass, asbestos, potassium titanate, aluminum silicate, mineral wool, regenerated cellulose, polyvinyl chloride, polyvinylidene chloride, polyacrylonitrile, polyethylene, polypropylene, rubber, polymers of terephthalic acid and ethylene glycol, polyamides, casein fibers, zein fibers, cellulose acetate, viscose rayon, hemp, jute, linen, cotton, silk, wool, mohair, paper, and metallic fibers. Particulate materials such as diatomaceous earth, fuller's earth, silicon, magnesia, silica, talc, silica gel, alumina, quartz, carbon, activated carbon, clays, synthetic resins and cellulose derivatives, such as polyethylene, polystyrene, polypropylene, urea-formaldehyde, phenol-formaldehyde, polytetrafluorethylene, polytrifluorochloroethylene, polymers of terephthalic acid and ethylene glycol, polyacrylonitrile, ethyl cellulose, polyamides, and cellulose acetate-propionate, and metal particles such as aluminum, iron, copper, nickel, chromium, and titanium and metal alloys of all kinds, such as monel, brass, stainless steel, bronze, Inconel, cupronickel, Hastelloy, beryllium, and copper can also be employed. Combinations of fibers and particles are also useful, such as combinations of diatomaceous earth and glass fibers.

The fluid medium used for the suspension is preferably inert to the particulate material. It should not dissolve a substantial amount thereof, although if the fluid is reused, the fact that some material is in solution is not a disadvantage, since a saturated solution is quickly formed ab initio. The fluid should be volatile at a reasonably elevated temperature below the melting point of the material to facilitate removal after the suspension is laid down. However, nonvolatile fluids may be desirable under certain conditions, and those can be removed, as is more fully described later, by washing out with a volatile solvent that is a solvent for the fluid but not for the particulate material. The fluid can be the liquid to be filtered by the layer.

Typical fluids are water, polyalkylene glycols, such as polyethylene glycols, poly 1,2-propylene glycols, and mono and di alkyl ethers thereof, such as the methyl, ethyl, butyl and propyl mono and di ethers, mineral lubricating oils, vegetable oils, and organic solvents such as xylene and petroleum ethers. Since the layer is potentially useful to filter any liquid, depending upon the choice of particulate material, obviously a wide selection of fluids is available, and such would be known to one skilled in this art.

In order to aid the formation of a more stable slurry, a dispersing agent can be incorporated therein.

The compression and hence bulk density of the layer can be varied by varying the differential pressure across the layer during laydown. The differential pressure is in turn dependent upon fluid velocity and viscosity, and the permeability of the layer. For a given differential pressure, the layer's density can be decreased by including a small amount of bulked or crimped coarse particles which can support the finer particles, and space them better, to avoid reducing the average pore size of the layer. However, pore size and pore configuration are best adjusted by appropriate adjustment in the proportions of multi-size particles and their mean diameter. The term "mean diameter" is given to particulate materials consistent in diameter, having only a slight variation each side of the mean, or having a considerable spread, usually, however, not in excess of a factor of 1 to 10, between maximum and minimum diameters above and below the mean diameter.

When particulate materials are deposited in the form of a porous layer, tortuous passages of varying sizes exist between the particles. These passages in the aggregate have a mean pore size which depends on:

(1) The mean diameter of the particles
(2) The shape of the particles
(3) The length of the particles (particularly fibers)
(4) The distance between adjacent particles Unless an arbitrary external force is applied during laydown, the last depends upon the first three, so that these can be said generally to control mean pore size under any given laydown conditions. In the case of fibers as the particulate material, fine and coarse fibers may be combined and blended to produce a layer having an intermediate mean pore diameter dependent on the proportions of these fibers. However, the ratio of mean fiber diameter and length should not exceed a certain value, to ensure that the finer fibers are held in place by the more rigid matrix of coarser fibers during a flow of fluid through the layer. In the case of glass fibers, it has been found that a coarse to fine fiber diameter ratio of 10:1 is a good maximum for formation of a good fiber matrix. Fibers mixed within this ratio may be present in any percentage from 0 to 100%, and be held in place without deterioration of the layer's filtration properties during flow of fluid. Blown or spun fibrous glass, as opposed to extruded filament, is particularly suitable for this blending because it has a large spread of fiber diameter for a given mean diameter, and this ensures an overlapping and interlocking of the largest fine fibers and the finest coarse fibers up to the 10:1 ratio, as stated. Extruded or filament glass has a very uniform diameter for a given denier, and may give less interlocking.

A layer formed by blending fibers A and B is produced by varying the proportions of fibers A and B at various points in the mat. Thus, one side of the mat consists of 100% A fibers, and the other side of 100% B fibers. Although the pores between these two extremes would be tortuous, and contain expansions and contractions, the mean pore would in effect be tapered. If the mean pore is envisioned as being straight, with straight tapered sides, the variation in mean pore diameter is said to be linear. If the sides of the taper are curved, the variation in mean pore diameter is nonlinear. It will be appreciated that an infinite number of linear and nonlinear configurations are available, by using various combinations of different size and length fibers. This variability is extremely advantageous in the laydown of depth filters, since in a "homogeneous" medium having a fixed mean pore size throughout the depth of the layer, only the mean pore size is chosen to give best results on a given contaminant, but a nonlinear tapered mean pore can be designed so that it accommodates the particle size distribution of the contaminant. Hence, between two given mean pore diameters, an increase in depth or length of pore means an increased dirt holding capacity for that particular particle size.

FIGURE 1 is a flow chart showing the various steps of the process of the invention. Slurries or suspensions of particulate material of different sizes to be blended are held in separate reservoirs of which only two, A and B, are shown, as exemplary. The slurries are blended together in varying proportions by the pump P, according to the size pores desired at any particular point in the deposited layer. The suspended particulate material in the reservoirs can be held constant but not necessarily alike, in which event the proportions of material are varied at the point of blending quite simply, by varying the rate of introduction of the slurries in the blend. Alternatively, the rate of introduction of the slurries can be kept constant, and the concentrations of suspended material in each reservoir varied as required, but this is more difficult to do. It is practical to do this when the particulate material can be handled by a solids feeder.

The combined mixture of particulate material is then fed to the base upon or into which the layer is to be deposited. This base necessarily has a porous structure which should be fine enough to retain the smallest particles first deposited, so that these particles are separated from the fluid as it passes through. Normally, the base will support much finer particles than its pore diameter. Hence, bases as coarse as a 200 mesh screen may be used to support glass fibers of the order of 1 micron in diameter. If the base is to form an integral part of the porous layer, it is of course removed with the layer when deposition is complete. Any base can be employed, such as a metal screen, or perforated sheet, or cloth, paper or membrane. Also, the base can be itself a laid-down structure formed upon a base.

The base can be in any physical form or configuration, such as a flat sheet, a convoluted or corrugated sheet, or a cylinder of either of these, such as a filter unit or assembly including any of these as a filter element.

There can be incorporated in the fluid medium in which the particulate material is suspended a bonding agent or binder for bonding the particulate material in the deposited layer. Such binders are called beater addition binders in the paper industry. Alternatively, the bonding agent or binder may be flowed through the deposited layer as a final operation. The binder can also be incorporated in the layer after lay-down, if it has a deleterious effect upon the slurry. It can for example be washed through the layer after the fluid has been drawn off. Any type of adhesive or binder can be employed; it must, of course, be dispersible in the fluid. Many useful binders are known in nonwoven fabric art. Thermosetting binders requiring heating or ageing to effect a cure can be incorporated, and in this case provision is made for curing the binder in situ after deposition.

Typical thermoplastic binders include polyethylene, polypropylene, polymethylene, polyisobutylene, cellulose acetate, ethyl cellulose, copolymers of vinyl chloride and vinyl acetate, polyvinyl chloride, polyvinylidiene chloride, polyvinyl butyral, polyacrylic resins, such as polymethyl methacrylate, alkyd resins, and synthetic rubbers such as butadiene-styrene polymers. Thermosetting binders that can be used include phenol-formaldehyde resins, urea-formaldehyde resins, melamine-formaldehyde resins, polyester resins, and epoxy resins, such as polymers of ethylene chlorohydrin and bisphenol "A." Binders which are used in solution form to apply them to the layer include any of the above and also polytetrafluoroethylene, polytrifluorochloroethylene, lignin sulfonate resins, starch binders, casein binders, and terpene resins.

It is also possible to bond the particulate material together, if the material is thermoplastic or is rendered adhesively tacky by the action of organic solvents, by application of heat or solvent with some pressure at the time the particulate material is tacky. The particles will then be brought together and adhered to each other so that when the material has cooled or the solvent removed they will be bonded to each other. Such techniques are well known in the nonwoven fibrous bat art, and need not be further elaborated upon here.

It will be apparent that when the proportions of the multi-sized particulate material are adjusted by the rate of introduction of the slurry in the blend, that this rate of introduction can be changed continuously and uniformly or continuously and at an arbitrarily chosen increasing or decreasing rate.

In a linear layer containing two sizes of particles, the percentage of large particles may vary uniformly from 0 to 100 from one surface to the other of the layer, and the percentage of small particles varies inversely from 100 to 0. In a non-linear layer, the percentages may vary nonuniformly from 0 to 100 and 100 to 0, so that an increased percentage of fine or coarse particles is obtained in a given part of the layer.

Figure 2:
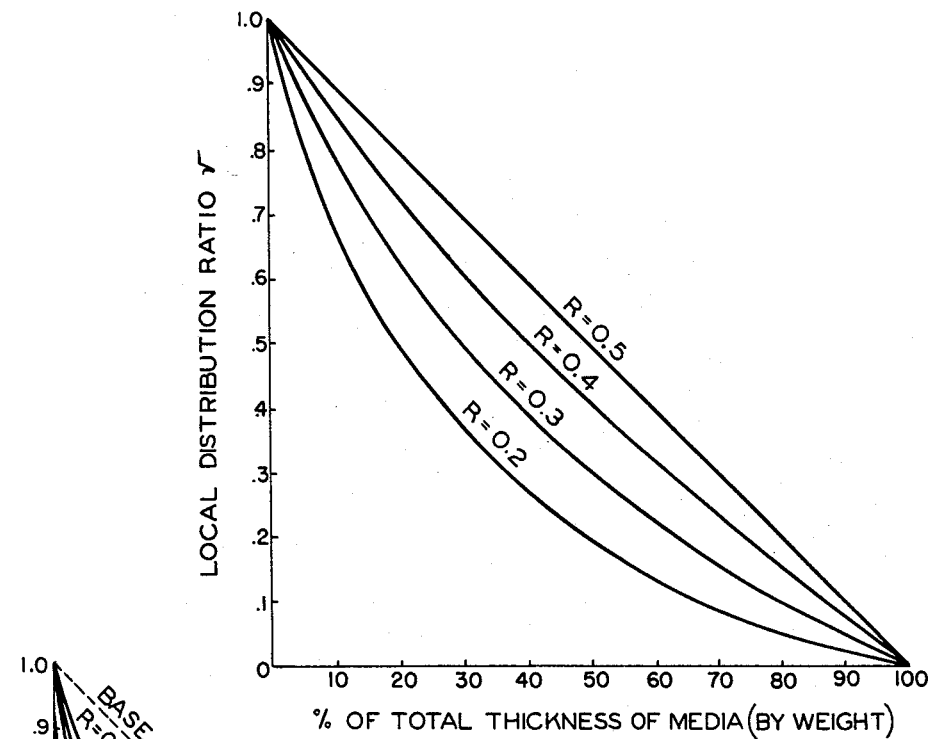

FIGURE 2 shows the distribution of particles, for example, fibers, in terms of the ratio of fine fibers to total fibers, when the rates of feed of the two fiber slurries are varied uniformly and continuously from 0 to 100 for fine fibers and from 100 to 0 for coarse fibers.

$$R = \frac{\text{total weight of fine fibers}}{\text{total weight of fibers}}$$

The family of curves show the distribution of fibers when the percentage of fine fibers ranges from 50% to 20%, i.e., when R ranges from 0.5 to 0.2.

Figure 3:
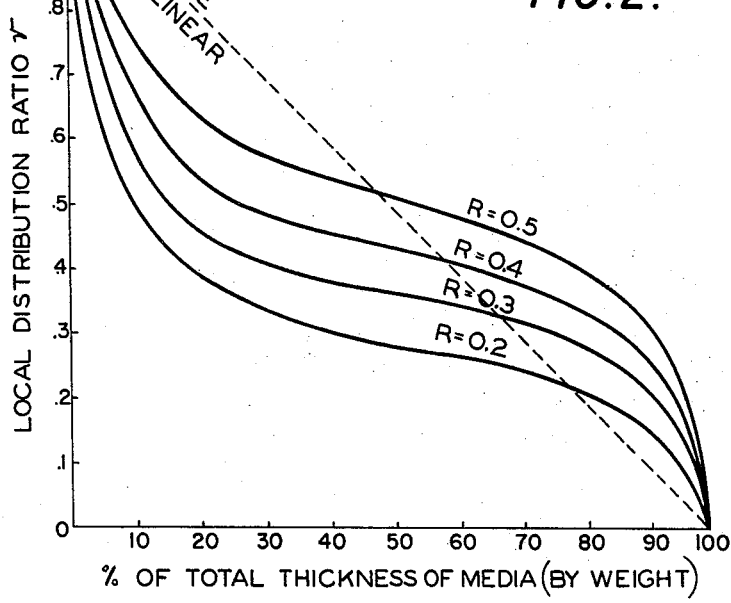

FIGURE 3 shows the distribution of fibers when the rates of feed of the two fiber slurries are varied in an arbitrary and nonuniform manner but continuously from 0 to 100 for fine fibers and from 100 to 0 for coarse fibers, and for percentages of fine fibers ranging from 50% to 20%, i.e., when R ranges from 0.5 to 0.2.

Figure 4:
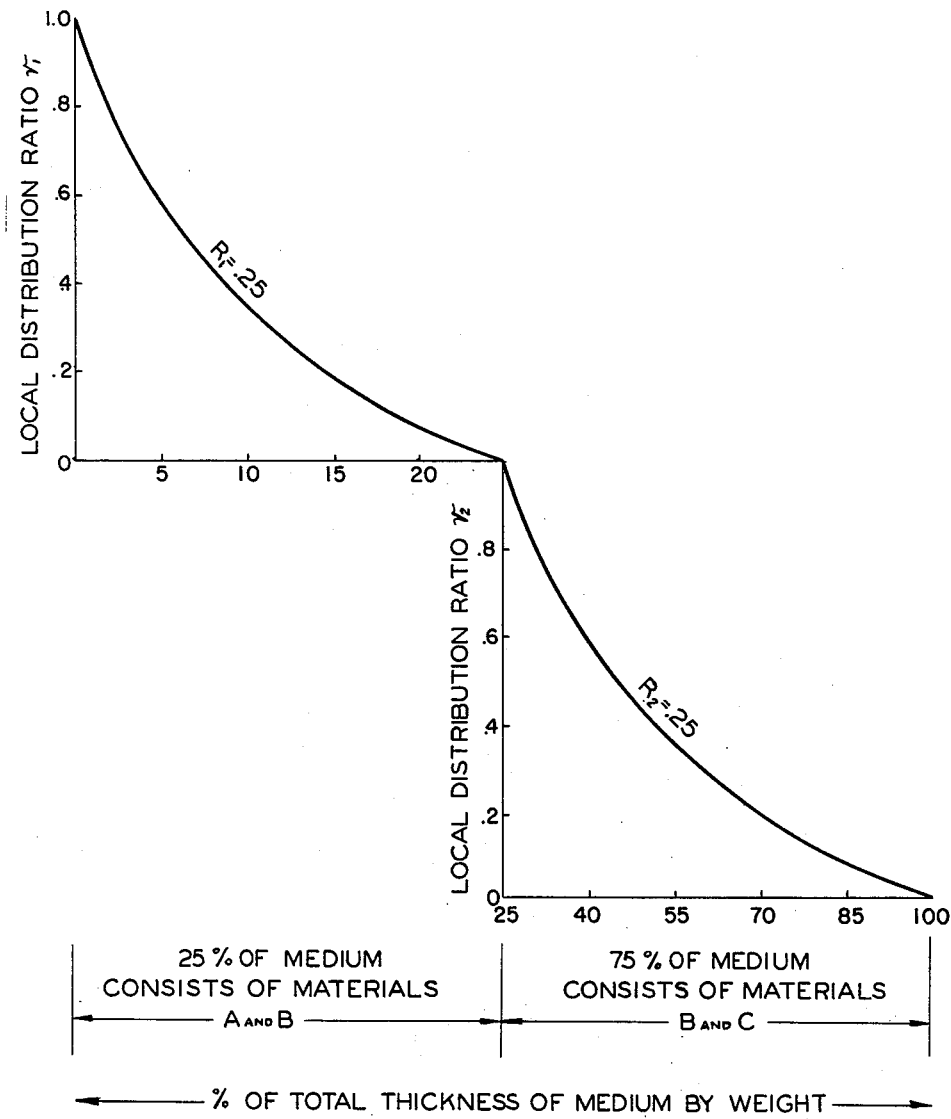

FIGURE 4 shows a further variation, the principle of which may be applied to linear or nonlinear distribution of fibers. In this example a nonlinear pore is formed having a very large ratio of maximum to minimum mean pore diameter. This is obtained by using three dispersions of three sizes of fibers A, B and C, so that A, fine asbestos fibers, is blended during deposition with fiber B, 1.2 micron mean diameter glass fibers. During deposition the percentage of A in the blend decreases until the deposited slurry consists entirely of B fibers. At or even before this point, the largest fibers C are introduced in a gradually increasing percentage. The resultant effect is a medium ranging from fine fiber A to coarse fiber C, having an intermediate fiber B to bridge the great difference between the diameters of A and C.

It is apparent from the curves that the percentage of fine fibers in any part of the layer can be read off directly simply by following the curve giving the over-all percentage of fine fibers for the layer. More importantly, the profile of this curve is an indication of the shape of the mean pore through the media.

Figure 5:
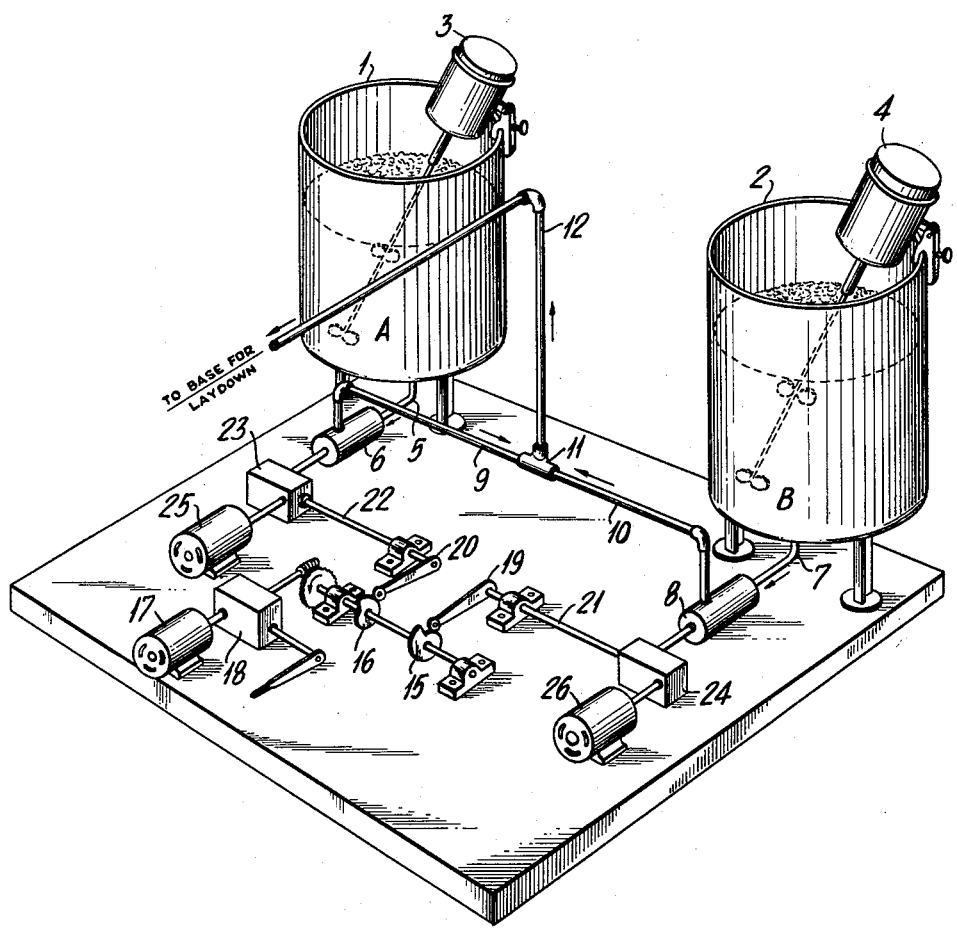

FIGURE 5 illustrates an apparatus for depositing either linear or nonlinear layers as desired. The apparatus comprises two reservoirs, 1 and 2, one for each size of particle to be blended. In the system shown 1 is employed for the slurry of small particles, such as fine fibers, and 2 for the slurry of large particles, such as coarse fibers. The slurries are maintained uniform by the stirrers 3 and 4. A line 5 is provided for delivering slurry from reservoir 1 to a pump 6, and a similar line 7 is provided in conjunction with reservoir 2 for delivery of slurry to pump 8. The pumps 6 and 8 respectively, deliver the slurries through lines 9 and 10 to blending point 11, whence the blend is delivered through line 12 to the base to be covered.

The rate of feed of the slurries from the reservoirs 1 and 2 and through pumps 6 and 8 is controlled by regulating the speed of these pumps. This is accomplished by a pair of cams 15 and 16. The rise and fall of these cams causes the output of these pumps to vary in relation to each other. The shape of the cams controls the rate of change of proportioning of the blend, and determines whether it is uniform or nonuniform. The cams are rotated by the cam input motor 17 via the variable speed gear 18, and the motion of the cams is transmitted by the cam followers 19 and 20 and the speed control shafts 21 and 22 through the variable speed gears 23 and 24 to the pumps 6 and 8. The variable speed gears 23 and 24 are operated by the pump motors 25 and 26.

With this apparatus, it is apparent that the distribution of particles laid down can be controlled by appropriate adjustment of any one or more of the following variables:

(1) The size of particles in reservoirs 1 and 2.
(2) The type of suspending fluid and its viscosity.
(3) The concentration of the particles in the slurries.
(4) The rate of feed of the slurries to the blending point.
(5) The flow of fluid per unit area per unit time through the base on which the fibers are deposited.

(6) The shape of the cams and hence the distribution of the fibers.

(7) The speed with which the cams move and hence the volume of slurry pumped per revolution of the cams.

After the layer has been completely formed, it may be desirable to remove therefrom substantially all or a part of the fluid medium of the slurry. This is indicated, for example, if the layer is to be impregnated with a binder. Usually, if the fluid is sufficiently volatile, it can be removed by drawing warm or hot air through the layer by application of a differential pressure across the layer, in the same manner as that by which the layer is formed. A nonvolatile liquid can be removed by washing it out with a volatile solvent and then removing the solvent in this way.

If it is necessary to cure any bonding agent for the particles thereof, a curing oven can be provided, through which the base is passed after the layer is laid down. The layer is then also dried in this oven.

Provision is made in this system for drawing the suspending fluid through the base 14 by differential pressure. This can be followed by a wash fluid such as water, if necessary. By proper adjustment of differential pressure during laydown, variation in the density of the layer can be obtained, and this may be set in the layer by the curing or bonding operation, if any.

The following examples in the opinion of the inventors represent the best embodiments of their invention. In the examples, the dirt capacity of the porous layers was evaluated by the following test:

*Test fluid* M1L-H-5606 hydraulic fluid (compounded from petroleum base stock, pour point (maximum) −59.4° C., flash point (minimum) 93.3° C., acid or base number (maximum) 0.10 precipitation number 0, and containing up to 10% by weight polymers, 2% by weight oxidation inhibitors and 0.4 to 0.6% by weight tricresyl phosphate) having a viscosity of 11.5 centipoises at the test temperature of 100° F.

*Test flow rate* 8 gallons per minute per square foot of area.

*Maximum porous layer thickness* 3.5 mm.

*Contaminant* Standardized AC fine test dust having the following particle size distribution:

| Size range ($\mu$): | Percent by weight |
|---|---|
| 0.5 | 39±2 |
| 5–10 | 18±3 |
| 10–20 | 16±3 |
| 20–40 | 18±3 |
| 40–80 | 9±3 |

*Standard for filtration efficiency.*—As obtained by a 3 microns absolute pore size nitrocellulose membrane. The dirt-containing fluid was passed through the layer under the test conditions stated above to a final differential pressure of 100 p.s.i.

In this test, the possibility of developing an inefficient filter with an apparently high dirt holding capacity was obviated by the presence of the 3 microns absolute nitrocellulose membrane, which would have plugged immediately if the fibrous glass structure had not retained the solid contaminants.

EXAMPLE 1

Two separate dispersions of glass fibers were prepared in M1L-H-5606 hydraulic fluid, a petroleum base hydraulic fluid, one fiber having a mean diameter of 0.35 micron, the other having a mean diameter of 3.5 microns. These were deposited on a 3 micron nitrocellulose membrane to form a porous layer so that the fibers adjacent to the membrane were composed entirely of 0.35 micron mean diameter fibers while the top surface was composed entirely of 3.2 micron fibers. The fiber distribution in between was as shown in FIGURE 2, so that the overall ratio R of fine fibers to total fibers (by weight) was 0.25, and the deposition weight was 34 grams per square foot.

EXAMPLE 2

Example 1 was repeated, substituting two fibers whose average diameters were 1.2 and 10 microns, respectively. These were deposited on the same base as in Example 1 with a fiber distribution as shown in FIGURE 3, so that the overall ratio R of fine fibers to total fibers (by weight) was 0.33 and the deposition weight was 80 grams per square foot.

EXAMPLE 3

Three dispersions were prepared using M1L-H-5606 hydraulic fluid, one containing 1.2 micron mean diameter glass fibers, another containing 3.5 micron mean diameter glass fibers and the third containing diatomaceous earth. These materials were deposited on the same base as in Example 1 with a fiber distribution as shown in FIGURE 2, so that the overall ratio R of weight of 1.2 micron fibers to total fiber weight was 0.25 and the fiber deposition weight was 46 grams per square foot. The diatomaceous earth was deposited in direct proportion and simultaneously with the 1.2 micron fibers, so that the ratio R of diatomaceous earth to combined total weight of diatomaceous earth plus weight of 1.2 micron fibers was 0.33.

EXAMPLES 4–16

Example 1 was repeated substituting the fibers named in the table which follows. These were deposited on the same base as Example 1, so that the R ratio was as indicated in the table. The table also indicates the deposition weight and the type of fiber distribution used. The dirt capacity for the filters obtained also is given in the table.

*Table I*

| Example Number | Material Average Diameter | Ratio R | Fiber Distribution | Total Fiber Weight, gr./sq. ft. | Dirt Capacity to 100 p.s.i., gr./sq. ft. |
|---|---|---|---|---|---|
| 1 | Glass 0.35 micron / Glass 3.5 microns | 0.25 | Figure 2 | 34 | 24 |
| 2 | Glass 1.2 microns / Glass 10 microns | 0.33 | Figure 3 | 80 | 25 |
| 3 | Diatomaceous Earth / Glass 1.2 microns / Glass 3.5 microns | 0.33 / 0.25 | Homogeneous / Figure 2 | 46 | 28 |
| 4 | Glass 2 microns / Glass 10 microns | 0.5 | ----do---- | 34 | 7.2 |
| 5 | Glass 0.6 micron / Glass 3.5 microns | 0.5 | ----do---- | 34 | 13 |
| 6 | Glass 0.35 micron / Glass 2.0 microns | 0.09 | ----do---- | 19 | 15 |
| 7 | Glass 0.35 micron / Glass 10 microns | 0.33 | ----do---- | 26 | 16 |
| 8 | Glass 0.35 micron / Glass 3.5 microns | 0.17 | ----do---- | 20 | 17 |
| 9 | Glass 0.35 micron / Glass 3.5 microns | 0.33 | ----do---- | 26 | 21 |
| 10 | Glass 0.35 micron / Glass 3.5 microns | 0.25 | ----do---- | 17 | 21 |

Table 1—Continued

| Example Number | Material Average Diameter | Ratio R | Fiber Distribution | Total Fiber Weight, gr./sq. ft. | Dirt Capacity to 100 p.s.i., gr./sq. ft. |
|---|---|---|---|---|---|
| 11 | Glass 0.35 micron<br>Glass 3.5 microns | 0.28 | Figure 3 | 36 | 18 |
| 12 | Glass 0.35 micron<br>Glass 3.5 microns | 0.20 | ----do---- | 36 | 25 |
| 13 | Glass 0.35 micron<br>Glass 3.5 microns | 0.10 | ----do---- | 36 | 16 |
| 14 | Diatomaceous Earth<br>Glass 0.35 micron<br>Glass 3.5 microns | 0.33<br>0.25 | Figure 2 | 46 | 24 |
| 15 | Diatomaceous Earth<br>Glass 0.35 micron<br>Glass 3.5 microns | 0.22<br>0.25 | Figure 2 | 46 | 24 |
| 16 | Diatomaceous Earth<br>Glass 0.35 micron<br>Glass 3.5 microns | 0.5<br>0.25 | Figure 2 | 46 | 20 |

EXAMPLE 17

For comparison purposes, a homogeneous fibrous layer was prepared and tested. It was found that in order to retain the solid contaminant within the fibrous structure, the average fiber diameter had to be not larger than 1.2 microns. A deposited weight of 23 grams per square foot brought this within the 3.5 mm. thickness limitation and the resultant dirt holding capacity was only 8 grams per square foot. This is only 32% of the dirt holding capacity obtainable by adding 10 micron fibers in a gradually increasing percentage as in Example 2, and less than 30% of the dirt capacity obtained in Example 3.

It is apparent from the above data that the fibrous mats embodying the principle of the tapered mean pore gave more than three times the dirt holding capacity of the homogeneous mat, and could be produced in such a form that the effluent fluid would not plug the 3 micron nitrocellulose membrane on which the fibers were deposited. It follows that the deposition of the fibers on any reasonably smooth porous surface such as paper, fine screen, porous sintered materials, etc., would produce a filter of equal dirt holding capacity and similar clarity of effluent.

EXAMPLE 18

Two separate dispersions of asbestos fibers were prepared in water, one fiber having a Quebec test value (Manual of Testing Procedures for Chrysotile Asbestos Fibre, Asbestos Textile Institute, pp. 36-40) of 0-0-0-16, the other having a Quebec test value of 0-0-12-4. These were deposited on a cotton fiber filter paper to form a porous layer so that the fibers laid down first were composed entirely of 0-0-12-4 fibers while the top was composed entirely of 0-0-0-16 fibers. The fiber distribution in between was of the type shown in FIGURE 2, so that the overall ratio R of coarse fibers to total fibers (by weight) was 0.062, and the deposition weight was 9 grams per square foot.

The porous layers of the invention are useful as filters for separating solid particles from liquids and gases, as coalescers for separating suspended droplets in fluid media, as agglomerators for separating fluids entrained in gases, as gas diffusers, as dialyzing membranes, and as porous separators in all types of apparatus employing fluids for any purpose, such as separators in batteries and diaphragm cells. They can be made to have a wide range of porosities, to meet any need. The pores can for example be made small enough to remove bacteria and like minute organisms. They can be used as shock absorbers, molded cushioning, acoustical absorbers, and in heat and sound insulation.

We claim:

1. A process for preparing porous depth filters having pores which vary in diameter and configuration from surface to surface of the material, comprising blending continuously at least two separate suspensions comprising particulate material suspended in a fluid, the separate suspensions severally comprising particulate material of different sizes while varying the proportions blended of particulate material of each size sequentially, and depositing the mixture thus produced upon a base to form a porous material, thereby producing a material having a pore diameter and pore configuration varying from surface to surface thereof.

2. A process in accordance with claim 1 in which the particulate material is a fibrous material.

3. A process in accordance with claim 1 in which the particulate material is a granular material.

4. A process in accordance with claim 1 in which one of the particulate materials is a fibrous material, and another of the particulate materials a granular material.

5. A process in accordance with claim 1 in which three different size particulate materials are blended.

6. A process in accordance with claim 1 in which two particulate materials A and B are blended, in proportions varying from 100% A and 0% B, at the start of the blending, down to 100% B and 0% A at the conclusion of the blending.

7. A process in accordance with claim 6 in which the proportions of A and B are varied uniformly and continuously from surface to surface of the material.

8. A process in accordance with claim 6 in which the proportions of A and B are varied nonuniformly but continuously from surface to surface of the material.

9. A process in accordance with claim 1 in which the porous material is removed from the base following deposition.

10. A process in accordance with claim 1 in which the particulate material is deposited upon a base which remains a part of the porous material after deposition.

11. A process in accordance with claim 10 in which the base is impregnated by the particulate material during deposition.

12. A process in accordance with claim 1 in which the particulate material comprises glass fibers of different sizes.

13. A process in accordance with claim 1 in which the particulate material comprises a blend of glass fibers and diatomaceous earth.

14. A porous depth filter prepared in accordance with the process of claim 1 and comprising particulate material of at least two sizes blended together in varying proportions from surface to surface, thereby defining pores varying in diameter and configuration and extending from surface to surface of the material.

15. A porous depth filter in accordance with claim 14 having a base of porous material attached thereto.

16. A porous depth filter in accordance with claim 14 having a base of porous material imbedded therein.

17. A porous depth filter in accordance with claim 14 in which the pores are tapered uniformly in diameter and configuration from surface to surface of the material.

18. A porous depth filter in accordance with claim 14 in which the pores are tapered nonuniformly from surface to surface of the material.

References Cited in the file of this patent

UNITED STATES PATENTS

| | | |
|---|---|---|
| 1,672,988 | Novak | June 12, 1928 |
| 1,921,504 | Chase et al. | Aug. 8, 1933 |
| 2,371,313 | Rast et al. | Mar. 13, 1945 |
| 2,372,437 | Lathrop | Mar. 27, 1945 |
| 2,414,833 | Osborne | Jan. 28, 1947 |
| 2,503,454 | Quinn | Apr. 11, 1950 |
| 2,517,753 | Ximenez et al. | Aug. 8, 1950 |
| 2,539,768 | Anderson | Jan. 30, 1951 |
| 2,698,972 | Keeler | Jan. 11, 1955 |
| 2,708,982 | McGuff | May 24, 1955 |
| 2,919,211 | Labino | Dec. 29, 1959 |
| 2,928,765 | Kurjan | Mar. 15, 1960 |
| 2,971,907 | Smith | Feb. 14, 1961 |
| 3,039,914 | Reiman | June 19, 1962 |

FOREIGN PATENTS

| | | |
|---|---|---|
| 1,236,747 | France | June 13, 1950 |